United States Patent Office 3,496,824
Patented Feb. 24, 1970

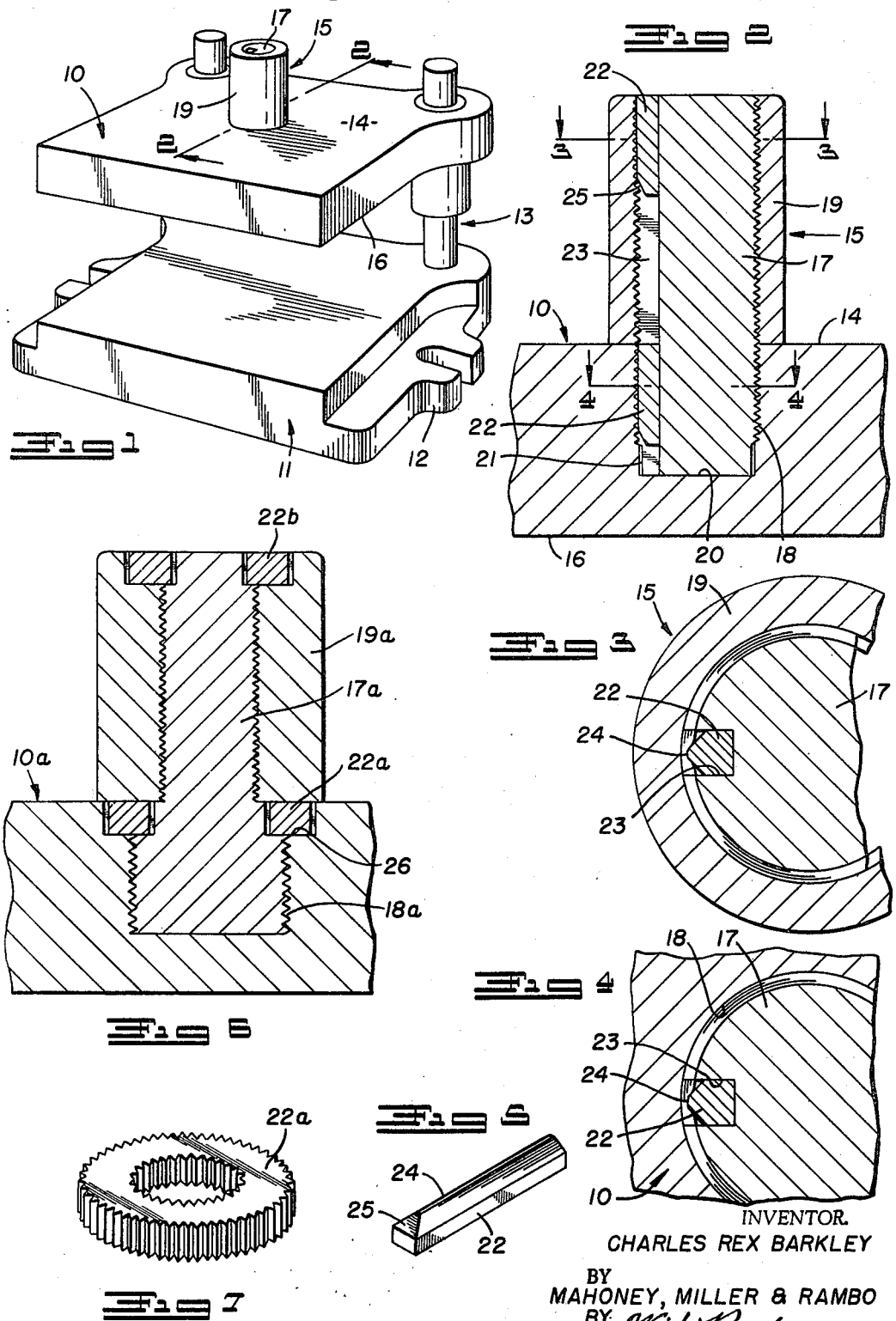

3,496,824
COMPOSITE SHANK FOR DIE SETS
Charles Rex Barkley, New Lexington, Ohio, assignor to Lempco Industries, Inc., Bedford, Ohio, a corporation of Ohio
Continuation of application Ser. No. 585,111, Oct. 7, 1966. This application Apr. 15, 1968, Ser. No. 748,135
Int. Cl. B26d 1/00
U.S. Cl. 83—698        7 Claims

ABSTRACT OF THE DISCLOSURE

A composite die set shank assembled from an inner core or stud connected to the movable shoe of the die set, an outer, tubular sleeve of selected size and shape threadedly engaged with the stud, and key means for locking the stud to the movable shoe and the sleeve to the stud.

Cross-reference to related application

This application is a continuation of my copending application Ser. No. 585,111 filed Oct. 7, 1966, now abandoned, entitled "Composite Shank for Die Sets" which is being abandoned concurrently with the filing of this application.

Background of the invention

This invention relates generally to die sets, and more particularly, with the shank component which projects from the movable plate or shoe of a die set for connecting the movable plate or shoe to the movable chuck or platen of a press or similar forming machine. As will be understood by those skilled in the art, die sets usually comprise upper and lower shoe components which are, respectively, attached to the relatively movable members of a press, and which are adapted to support in exacting, mating registry a pair of cooperative punch and die members. The shank serves as the connecting member between the upper movable shoe of the die set and the movable platen of the press.

To insure accuracy in movement of the movable shoe of the die set without undue stress and strain, and to facilitate the mounting of the die set in the press, it is necessary that the shank be rigidly and accurately fixed to the shoe. Various arrangements have been provided in the past for securing the shank to the movable shoe of a die set. One has included a socket formed in the one surface of the shoe but not extending entirely therethrough to the working surface thereof and with the shank welded rigidly in the socket. However, this welding operation usually distorts or warps the working face of the shoe, which must be very accurately finished, and requires expensive reworking of that surface. Also, since the welding of the shank requires a high degree of accuracy and subsequent remachining of the working face of the die set shoe, this operation is usually performed at the factory. This results in a high inventory of finished die sets due to the many different sizes and types of shanks necessary to fit all of the various sizes and types of presses. Other die sets embody a shank having a reduced screw-threaded end which is screwed fully into a threaded bore extending completely through the shoe to the working face thereof, and which is then permanently secured therein by a locking peg or "Dutchman" which is driven between the screw-threaded end of the shank and the wall of the bore from the underside or working face of the shoe. Since the shank and shoe are usually formed from steels of different hardness, it is often difficult, if not impossible, to accurately drill into the working face of the shoe, in the area of the shank, for the purpose of mounting punch or die parts on the shoe.

Summary and objects of the invention

It is the main object of this invention to provide a composite die set shank which can be accurately and easily mounted on the movable shoe of a die set without requiring remachining or refinishing of the working face of the shoe, and without otherwise interfering with the mounting of punch or die members on the shoe.

A further object is to provide a composite shank which may be quickly and easily assembled and mounted on an associated shoe on receipt of an order for a given size and type of die set, thereby eliminating the necessity of inventorying a large stock of die sets having shanks of various sizes mounted thereon.

Yet another object is to provide a die set shank which may be quickly and easily assembled from standardized, interchangeable parts of different sizes and dimension so as to satisfy the requirements of various different types and sizes of presses.

Another object of this invention is to employ a shank assembly which does not require welding into the socket in the shoe which might cause distortion of the shoe.

A further object of this invention is to provide a shank assembly which can be mounted and keyed on the shoe without boring a receiving socket entirely through the shoe to the working face thereof.

For a further and more detailed understanding of the present invention, reference is made to the following description and the accompanying drawing, wherein:

FIGURE 1 is a perspective view of a die set showing the shank assembly of this invention applied to the upper shoe and projecting from the upper surface thereof.

FIGURE 2 is a vertical sectional view taken on line 2—2 of FIGURE 1 and axially through the shank assembly.

FIGURE 3 is an enlarged, fragmentary, horizontal or transverse sectional view taken along line 3—3 of FIGURE 2.

FIGURE 4 is a similar view, but taken at line 4—4 of FIGURE 2.

FIGURE 5 is a perspective view of one of the locking keys used in the shank assembly of FIGURES 1–4.

FIGURE 6 is a view similar to FIGURE 2, but showing a modified form of shank assembly.

FIGURE 7 is a perspective view of a lock washer-type key used in the assembly of FIGURE 6.

With particular reference to FIGURE 1, there is illustrated a die set comprising an upper, movable shoe 10 and a lower shoe 11. The lower shoe may be fastened to the bed of a press by means including the slotted, laterally extending lugs 12. The upper shoe is adapted to be connected with the movable platen of the press by the upstanding shank assembly of this invention which is indicated generally at 15. The upper shoe, in the usual manner, is provided with an accurately machined lower working face 16 to which a punch or die (not shown) may be attached. The shoes will reciprocate relatively with the press members and may be guided in this reciprocation by guide post and bushing units 13 of any suitable type.

The shank assembly 15 is mounted centrally on the die set and extends upwardly from the upper surface or face 14 of the shoe 10. In general, the shank assembly 15 of this invention comprises a central, screw-threaded stud 17 which is mounted in a suitable upwardly opening socket 18 formed in the upper shoe 10, and a separate sleeve 19 which is threadedly mounted on the portion of the stud projecting upwardly from the surface 14 and is nonrotatably fixed thereto.

The socket 18 preferably extends only partly through the shoe and terminates in a bottom surface 20 disposed above the working face 16 of the shoe 10. This socket is tapped so as to threadedly receive the lower end portion of the stud 17.

The stud 17 is preferably of uniform diameter and is threaded throughout the major part of its length, with the threads terminating just short of its inner or lower end, as indicated, at 21. Thus, the lower end portion of the stud may be screwed fully into the threaded socket 18 until its inner flat end contacts the bottom 20 of the socket. In the final assembly of the shank 15 on the upper shoe 10, the stud 17 is rigidly and non-rotatively locked in its fully seated position in the socket 18 by means of a locking key 22 which is forcibly driven downwardly in a longitudinally extending keyway 23 formed in the outer surface of the stud 17 and into swaging engagement with the threads of the socket 18.

The upper projecting end portion of the stud 17 is adapted to threadedly receive thereon a selected size and shape of internally screw-threaded sleeve 19. The sleeve 19 is threaded fully onto the upper end portion of the stud 17 until the lower end of the sleeve tightly engages the upper surface 14 of the upper shoe 10. The sleeve is then rigidly and non-rotatively locked on the stud 17 by driving a second locking key 22 into the upper end of the keyway 23 and into swaging engagement with the threads of the sleeve 19.

As will be noted particularly from FIGURES 3–5 of the drawing, each of the keys 22 has a modified, pyramidal cross-sectional configuration which provides a blunt, wedge-shaped swaging edge 24 extending substantially throughout the length of the key. The key 22 is also formed with a beveled or tapered leading end surface 25 disposed ahead of the edge 24 to facilitate driving of the key into the keyway 23. The thickness of the keys 22 is such that their blunt edges 24 will intersect substantially the full depths of the threads of the socket 18 and the sleeve 19. As the key 22 is forcibly driven downwardly in the keyway, its blunt edge will swage, displace, and/or deform the metal of the threads of the socket 18 or the sleeve 19, rather than cut particles therefrom, thereby firmly locking the stud 17 in the socket 18 and the sleeve 19 on the stud. The lower key 22 is driven downwardly into the keyway 23 prior to the assembly of the sleeve 19 on the stud, and to a depth at which its upper end is either below or at least flush with the upper surface 14 of the shoe 10. By the same token, the upper key 22 is driven downwardly into the keyway 23 until its upper end is substantially flush with the upper end of the stud 17 and sleeve 19.

The modified shank structure disclosed in FIGURE 6 is similar to that previously described in that it includes the central, screw-threaded core or stud 17a and the outer sleeve 19a. However, a different arrangement is provided for fixing the sleeve 19a on the stud 17a and the stud to the shoe 10a to prevent relative displacement. In this case, the locking key means takes the form of annular, toothed or splined keys or collars 22a and 22b. The collars 22a and 22b are preferably of relatively harder metal than the members which they engage.

In this modified construction, the stud 17a is formed to provide a relatively enlarged lower end portion which is threadedly received in the socket 18a of the shoe 10a. The socket 18a is formed with a counterbore 26, and the annular, splined locking key or collar 22a is adapted to be forcibly driven into the counterbore with its teeth or splines biting into the adjacent side walls of the counterbore 26 and the stepped or shouldered portion of the stud 17a, so as to rigidly lock the stud against displacement from the socket 18a. Similarly, the upper end of the sleeve 19a is counterbored to receive the upper, annular locking key or collar 22b which is identical in construction to the collar 22a, but is of smaller diameter.

As previously indicated, the present composite shank construction enables the die set manufacturer and/or the die set dealer to maintain a considerably smaller inventory or stock of die sets than would ordinarily be required with die sets equipped with conventional, prior art shanks. This is made possible by reason of the fact that the shank may be easily and quickly assembled on its associated shoe upon receipt of a purchase order for a particular size of die set having a particular size and/or shape of shank. Thus, by stocking a number of standard length studs 17 and a series of different size, interchangeable sleeves to fit each size stud, the die set dealer is able to quickly assemble a desired size shank on a desired size of die set and deliver same to his customer, without resorting to special orders and delays in shipment from the factory. By the same token, shipment and warehousing of die sets to be equipped with the present composite shank is greatly simplified since the shank need not be assembled and mounted on the die set at the factory.

From the foregoing, it will be apparent that the present invention provides a composite shank of simple, inexpensive structure in which the stud core can be mounted in the die shoe without distortion of the shoe and without drilling entirely through the shoe to the working face thereof. The provisions of interchangeable sleeves of various types and sizes that can be selectively mounted on the core studs of standard form by simple tools greatly reduces the inventory of die sets which must be maintained by the dealer.

While certain preferred embodiments of this invention have been illustrated and described in detail herein, it should be understood that various modification as to details of construction and design may be resorted to without departing from the spirit of the invention or the scope of the following claims.

What is claimed is:

1. In a die set; a die-supporting, metal plate formed with a screw-threaded socket extending into the thickness of said plate; a screw-threaded metal stud having an inner end portion threadedly screwed in the socket of said plate and having an outer end portion extending outwardly beyond said socket; a sleeve threadedly carried on the outer end portion of said stud; and locking key means interconnecting said stud and socket and said stud and sleeve and operable to lock said stud against displacement from said socket and to lock said sleeve against displacement from said stud.

2. The combination defined in claim 1, wherein said stud is formed with a longitudinally extending keyway to receive said key means, said key way opening onto the screw-threaded outer surface of said stud adjacent said socket and sleeve, and wherein said locking key means is provided with a metal displacing edge arranged to displace metal from said plate and from said sleeve when said key means if forcibly seated in said keyway.

3. The combination defined in claim 1, wherein said plate is formed adjacent said socket with a relatively shallower counterbore, and said sleeve is formed adjacent one end thereof with a counterbore, and wherein said locking key means comprise a pair of annular locking washers having roughened inner and outer diametrical surfaces arranged to displace metal from said stud and said plate and sleeve when said washers are forcibly driven into said counterbores.

4. In a die set; a metal plate formed with a shank-receiving socket, and a composite shank for said plate comprising a metal stud having an inner end portion rigidly secured within the socket of said plate and having a screw-threaded outer end portion extending outwardly from said plate; a tubular metal sleeve threadedly engageable with the outer end portion of said stud; and means for locking said sleeve in threaded engagement with said stud.

5. The combination defined in claim 4, wherein said means comprises a locking key forcibly insertable between said stud and sleeve.

6. The combination defined in claim 4, wherein the lower end portion of said stud is threaded into the socket of said plate and secured against displacement therein by a locking key.

7. The combination defined in claim 4, wherein said means comprises a key forcibly insertable in a longitudinal keyway formed in the outer surface of said stud, following engagement of said sleeve with said stud, and having a substantially blunt, wedge-shaped outer edge portion projecting outwardly from the outer surface of said stud for deforming the inner surface of said tubular metal sleeve and thereby locking said sleeve against displacement from said stud.

References Cited

UNITED STATES PATENTS

| 978,508 | 12/1910 | Sutherland et al. | 83—698 X |
| 3,216,299 | 11/1965 | Stoeckli | 83—698 X |

FOREIGN PATENTS

| 633,234 | 12/1961 | Canada. |
| 839,329 | 1/1960 | Great Britain. |

WILLIAM S. LAWSON, Primary Examiner

U.S. Cl. X.R.

83—637, 701